Patented Oct. 12, 1943

2,331,415

UNITED STATES PATENT OFFICE 2,331,415

WATER-SOLUBLE COMPOUNDS

Heinrich Morschel, Leverkusen-Wiesdorf, and Wilhelm Meiser, Munich, Germany, assignors to General Aniline & Film Corporation, a corporation of Delaware No Drawing. Application October 25, 1939, Serial No. 301,160
In Germany November 11, 1938

6 Claims. (Cl. 260—315)

The present invention relates to derivatives of arylamides of aromatic o-hydroxycarboxylic acids being water-soluble and capable of coupling and to a process of preparing the same.

In U. S. Patent No. 2,246,071, issued June 17, 1941, water-soluble condensation products are described. These products are obtained by interacting arylamides of aromatic o-hydroxycarboxylic acids or the derivatives thereof, already acylated in the hydroxy group, with acylating agents in the presence of a tertiary base, the acylating agents being selected in such a manner that they contain besides the acylating group at least one solubilizing residue such as a carboxylic or sulfonic acid group or a residue which can be converted into a quaternary ammonium group. As acylating agents there may be used in this process the halides or anhydrides of organic carboxylic acids which contain at least a further salt-forming group, such as the carboxylic or sulfonic acid group, or a residue which can be converted into a quaternary ammonium group. Such compounds are the halides or anhydrides of polycarboxylic acids, sulfocarboxylic acids, further carboxylic acid halides containing a dialkylamino group or an ω-chloroalkyl group, which groups can be converted after the condensation, in a known manner, into quaternary ammonium compounds, or are converted into quaternary ammonium compounds during the condensation. The products obtained according to this process contain at least two acyl residues of which at least one is an acyl residue having one or more water-insolubilizing groups and is attached to the carbonylamide group.

We have now found that water-soluble derivatives of arylamides of aromatic o-hydroxycarboxylic acids capable of coupling can be obtained if the condensation products obtained according to the above described process are partially saponified. Watersoluble products are quite unexpectedly obtained by this process which have a free hydroxy group and still contain the acyl residue, having one or more solubilizing groups, attached to the carbonylamide group. This saponification can be easily performed. It is possible to carry it out in acid, neutral or alkaline medium. In many cases it is preferable to work at raised temperature.

The new products may be represented by the following general formula:

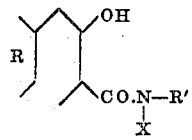

In this formula R stands for a benzene nucleus, a naphthalene nucleus or a heterocyclic nucleus, such as a carbazole nucleus, R' stands for an aromatic radical of the benzene or naphthalene series, and X stands for an acyl residue which contains at least one solubilizing group, such as a carboxylic or sulfonic group or a quaternary ammonium group. These products are accordingly derivatives of 2.3-hydroxynaphthoic acid, 2-hydroxyanthracene-3-carboxylic acid, phenanthrene-o-hydroxy-carboxylic acids and of o-hydroxy-carboxylic acid derived from heterocyclic compounds to which a benzene nucleus is condensed, as for instance the benzocarbazole-o-hydroxy-carboxylic acids.

The new products are water-soluble compounds capable of coupling and shall be used in the preparation of dyestuffs. The new compounds possess for instance the property of substantivity on animal fibers from an acid bath.

The following examples illustrate the invention without, however, restricting it thereto the parts being by weight.

Example 1

70.5 parts of the condensation product of 2 molecular proportions of benzoic acid 3-sulfochloride and one molecular proportion of 1-(2'-hydroxynaphthalene + 3' - carbonylamine) - 2-methoxy-benzene are dissolved in 300 parts of cold water and 140 parts of 1-N sodium hydroxide solution are added thereto within half an hour at ordinary temperature. The alkaline reaction disappears each time shortly after adding the sodium hydroxide solution. Towards the end of the reaction the difficultly soluble reaction product separates. The separation can be completed by adding sodium chloride. After isolating and drying, a product is obtained which is soluble in water and also in water acidified with a mineral acid. The product is capable of coupling with diazo compounds and corresponds in the form of its sodium salt to the following formula:

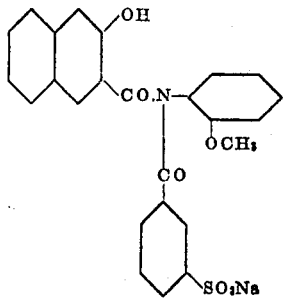

The condensation product used as starting material is obtained as follows:

58.6 parts of 1-(2'-hydroxynaphthalene-3'-carbonylamino)-2-methoxybenzene and 96 parts of benzoic acid 3-sulfo chloride are refluxed with 200 parts of dry pyridine for 2 hours. Thereupon the pyridine is distilled off in vacuo, the residue is dissolved in water, salted out by adding sodium chloride, isolated and dried.

*Example 2*

40 parts of the condensation product of 1 molecular proportion of 1-(2'-acetoxynaphthalene-3'-carbonylamino)-2-methoxybenzene and 1 molecular proportion of benzoic acid-3-sulfo chloride are dissolved in 470 parts of a 0.6% sodium hydroxide solution at 0-5° C. and the solution is allowed to stand for 5 hours. The reaction product is separated by adding sodium chloride, filtered off and dried. The product is identical with the product obtained according to Example 1.

The condensation product used in this example is obtained as follows:

To 500 parts of pyridine 330 parts of benzoic acid-3-sulfo chloride are added, the mixture becomes warm but the temperature is not allowed to rise above 70° C. After a short time crystals separate and a thick paste of crystals is formed. Thereupon 335 parts of 1-(2'-acetoxynaphthalene-3'-carbonylamino)-2-methoxybenzene are added and the mixture is heated to 70° C. for 8 hours. When cold the reaction mass is poured into 1000 parts of cold water. Next, 100 parts of sodium chloride are added while stirring and the supernatant aqueous layer is removed. The remaining condensation product is dissolved in 6000 parts of water of 50° C., filtered if desired, precipitated by adding 300 parts of sodium chloride, isolated and dried.

*Example 3*

40 parts of the condensation product of 1 molecular proportion of 2'-acetoxynaphthalene-3'-carbonylaminobenzene and 1 molecular proportion of benzoic acid-3-sulfo chloride are dissolved in 330 parts of a 0.5% sulfuric acid and heated for 2 hours to 50° C. When cold the reaction product is separated by adding sodium chloride and worked up as usual. The product corresponds in its free state to the following formula:

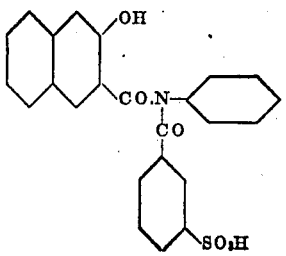

The condensation product used as starting material is prepared in the same manner as that described in Example 2 using instead of 335 parts of 1-(2'-acetoxynaphthalene-3'-carbonylamino)-2-methoxybenzene 305 parts of 2'-acetoxynaphthalene-3'-carbonylaminobenzene.

In the same manner as described above, from the condensation product of 1 molecular proportion of 1-(2'-acetoxynaphthalene-3'-carbonylamino)-2-methylbenzene and 1 molecular proportion of benzoic acid-3-sulfo chloride a saponification product is obtained which corresponds in its free state to the following formula:

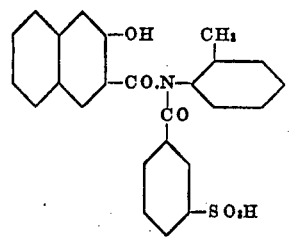

From the condensation product of 1 molecular proportion of 1-(1'.2'-1''.2''-benzo-5''-acetoxycarbazole-4''-carbonylamino)-2-methyl-4-methoxybenzene and 1 molecular proportion of benzoic acid-3-sulfo chloride a saponification product is obtained which corresponds in its free state to the following formula:

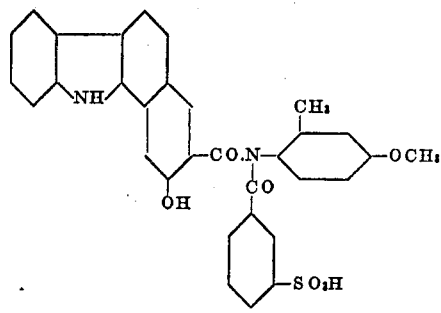

The condensation products used here as starting materials are prepared in a manner corresponding to that described in the previous examples.

*Example 4*

40 parts of the condensation product of 1 molecular proportion of 1-(2'-acetoxynaphthalene-3'-carbonylamino)-2-methoxybenzene and 1 molecular proportion of benzoic acid-3-sulfo chloride are dissolved in 480 parts of a 1% sulfuric acid and heated for 2 hours to 70° C. The reaction product separates from the solution when adding sodium chloride and is identical with the product obtained according to Example 1.

*Example 5*

40 parts of the condensation product of 1 molecular proportion of 1-(2'-propionyloxynaphthalene-3'-carbonylamino)-2-ethoxybenzene and 1 molecular proportion of benzoic acid-3-sulfo chloride are dissolved in 480 parts of a 1% sulfuric acid and heated for 2 hours to 70° C. The solution is worked up in the manner described in the previous examples. The product obtained corresponds in its free state to the following formula:

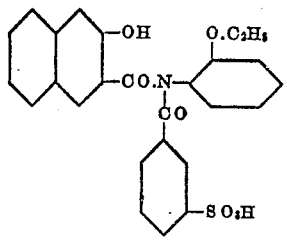

The condensation product used as starting material is obtained in the same manner as described in Example 2 using 363 parts of 1-(2'-propionyloxynaphthalene - 3' - carbonylamino)-2-ethoxybenzene instead of 335 parts of 1-(2'-acetoxynaphthalene - 3' - carbonylamino) - 2 - methoxybenzene.

*Example 6*

40 parts of the condensation product of 1 molecular proportion of 1-(2'-acetoxynaphthalene-3'-carbonylamino)-2-methoxybenzene and 1 molecular proportion of benzoic acid-3-sulfo chloride are dissolved in 400 parts of water to which solution 20 parts of sodium bicarbonate are added. The solution is boiled up and after cooling down the reaction product is salted out, isolated and dried. It is identical with the product obtained according to Example 1.

*Example 7*

40 parts of the condensation product of 1 molecular proportion of 1-(2'-acetoxynaphthalene - 3' - carbonylamino) - 2 -methoxybenzene, 1 molecular proportion of 4-chloromethyl-benzoylchloride and 1 molecular proportion of pyridine are dissolved in 360 parts of a 1% sulfuric acid and heated for 4 hours to 70° C. From the clear solution the reaction product is precipitated by adding sodium chloride, filtered off and dried. It is capable of coupling with diazo compounds and corresponds to the following formula:

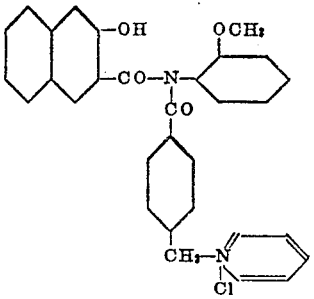

The condensation product used as starting material is obtained as follows:

Into 125 parts of pyridine 103.4 parts of 4-chloromethylbenzoyl chloride are introduced and after 20 minutes 167.5 parts of 1-(2'-acetoxynaphthalene- 3'-carbonylamino)-2-methoxybenzene are added whereby self-heating to about 90° C. occurs. The reaction mixture is now kept for 8 hours at the temperature of 90° C. Thereupon most of the pyridine is distilled off in vacuo and the residue is dissolved in the necessary amount of cold water (complete solution). By adding so much of hydrochloric acid that the mixture shows acid reaction to Congo red paper and some sodium chloride the reaction product can easily be separated in filterable form; it is isolated and dried.

We claim:
1. As new products derivatives of arylamides of aromatic o-hydroxycarboxylic acids being water-soluble and capable of coupling of the general formula:

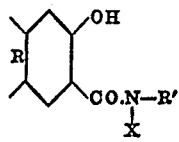

wherein R stands for a radical condensed to the benzene nucleus shown, which radical is a member of the group consisting of the benzene nucleus, the naphthalene nucleus and the carbazole nucleus, R' stands for an aromatic radical selected from the group consisting of the benzene and naphthalene series, and X stands for an acyl radical containing at least one water-solubilizing ionizable group selected from the class consisting of carboxylic acid groups, sulfonic acid groups and quaternary ammonium groups.

2. As new products derivatives of arylamides of aromatic o-hydroxycarboxylic acids being water-soluble and capable of coupling of the general formula:

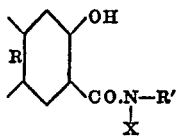

wherein R stands for a radical condensed to the benzene nucleus shown, which radical is a member of the group consisting of the benzene nucleus, the naphthalene nucleus and the carbazole nucleus, R' stands for an aromatic radical selected from the group consisting of the benzene and naphthalene series, and X stands for an aroyl radical containing at least one water-solubilizing ionizable group selected from the class consisting of carboxylic acid groups, sulfonic acid groups and quaternary ammonium groups.

3. As new products derivatives of arylamides of aromatic o-hydroxy-carboxylic acids being water-soluble and capable of coupling of the general formula:

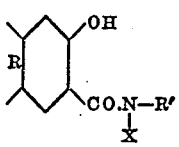

wherein R stands for a radical condensed to the benzene nucleus shown, which radical is a member of the group consisting of the benzene nucleus, the naphthalene nucleus and the carbazole nucleus, R' stands for an aromatic radical selected from the group consisting of the benzene and naphthalene series, and X stands for a benzoyl radical containing at least one water-solubilizing ionizable group selected from the class consisting of carboxylic acid groups, sulfonic acid groups and quaternary ammonium groups.

4. As new products derivatives of arylamides of aromatic o-hydroxycarboxylic acids being watersoluble and capable of coupling of the general formula:

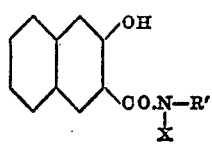

wherein R' stands for an aromatic radical selected from the group consisting of the benzene and naphthalene series, and X stands for a benzoyl radical containing at least one water-solubilizing ionizable group selected from the class consisting of salt-forming groups and quaternary ammonium groups.

5. As new products derivatives of arylamides of aromatic o-hydroxycarboxylic acids being water-soluble and capable of coupling of the general formula:

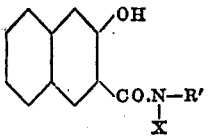

wherein R' stands for an aromatic radical selected from the group consisting of the benzene and naphthalene series and X stands for a sulfo-benzoyl radical.

6. As new products derivatives of arylamides of aromatic o-hydroxycarboxylic acids being water-soluble and capable of coupling of the general formula:

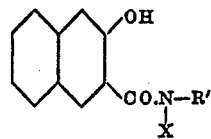

wherein R' stands for a radical of the benzene series and X stands for a sulfo-benzoyl radical.

HEINRICH MORSCHEL.
WILHELM MEISER.

Patent No. 2,331,415. October 12, 1943.

HEINRICH MORSCHEL ET AL.

It is hereby certified that errors appear in the printed specification of the above numbered patent requiring correction as follows: Page 1, first column, line 34, for "insolubilizing" read *solubilizing*; page 4, first column, line 6, claim 4, strike out "salt forming" and insert instead *carboxylic acid groups, sulfonic acid*; and that the said Letters Patent should be read with these corrections therein that the same may conform to the record of the case in the Patent Office.

Signed and sealed this 29th day of April, A. D. 1947.

[SEAL]

LESLIE FRAZER,
*First Assistant Commissioner of Patents.*